Jan. 13, 1959   M. KADOSCH ET AL   2,868,479
SYSTEM FOR CONTROL OF AIR FLOW OVER AN AIRCRAFT WING
Original Filed Dec. 27, 1951
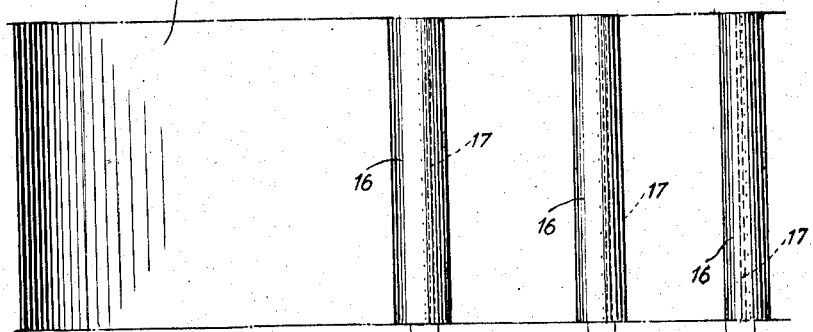
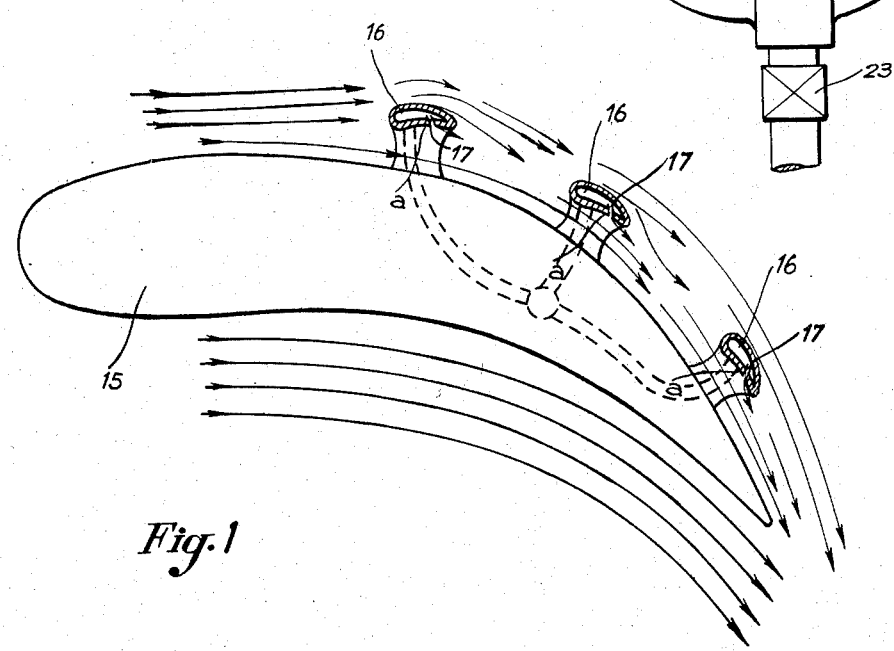

United States Patent Office 2,868,479
Patented Jan. 13, 1959

2,868,479
SYSTEM FOR CONTROL OF AIR FLOW OVER AN AIRCRAFT WING

Marcel Kadosch, Paris, Jean Le Foll, Le Pre-Saint-Gervais, Francois M. L. Maumoury, Paris, and Jean Bertin, Neuilly-sur-Seine, France, assignors to Societe Nationale d'Etude et de Construction de Moteurs d'Aviation, Paris, France, a company of France Original application December 27, 1951, Serial No. 263,666. Divided and this application December 8, 1953, Serial No. 396,991

Claims priority, application France January 4, 1951

2 Claims. (Cl. 244—42)

This application is a divisional application of our co-pending U. S. patent application Serial No. 263,666, filed December 27, 1951.

The present invention relates to the control of the flow of air along a wing surface, and more especially the upper surface of an aircraft wing.

An object of this invention is to provide improved means for carrying out this control.

According to this invention there is provided a device for controlling the flow of air over the upper surface of an aircraft wing, comprising a support member spaced from and in the vicinity of said upper surface at a substantial distance to the rear of the leading edge of said wing, said member having a face lying opposite said upper surface, and nozzle means on said member, opening out on said face thereof and adapted to form a gaseous jet substantially inclined towards said upper surface when said nozzle means is supplied with gas under pressure.

The invention is particularly applicable with a view to preventing separation of air flow from the upper surface of an aircraft wing. The nozzle means may comprise one or more outlets either of pinpoint form (in which case there is a fairly large number of outlets fairly close together) or of linear form, the said outlets being oriented in a direction such as to produce, when they are fed from a suitable source of gas under pressure, one or more screen-like jets having a velocity component perpendicular to the air flow to be controlled.

Further features and applications of the invention will become apparent from the following description and from the accompanying drawings, it being understood that both the features described in the text and those illustrated in the drawings form part of the said invention.

Figure 1 is a side view of an aircraft wing of large camber and illustrates the application of the invention to the regulation of the flow against the upper surface of such a wing.

Figure 2 is a plan view of a portion of the said wing and of the said flow-regulating members.

The drawing shows a wing 15 some distance above the upper surface of which small hollow support members 16 are disposed. The interior of the said hollow support members is fed with compressed gas by any desired source and the said hollow support members have a slot-like nozzle 17 oriented towards the upper surface of the wing 15. Each slot is oriented towards the upper surface of the wing 15 so that the auxiliary jet issuing therefrom tends to force the main flow towards the upper surface of the said wing. It is thus possible to avoid separation of the stream of fluid from an aerofoil of great curvature and such an arrangement is particularly interesting for additional lift devices, in particular for wing profiles of large camber and of great lift.

A valve 23 is provided to regulate the rate of flow of gas blown through the slots.

Naturally, the auxiliary support members 16 will be situated mainly in regions where such flow separation tends to occur, in particular near the trailing edge. The number of such auxiliary support members will vary in accordance with the profile of the main wing 15 and may be limited to one.

What we claim is:

1. The combination with a high-camber aircraft wing, of a device for preventing separation of air flow from the upper surface of said wing, comprising nozzle means extending spanwise of said wing, positioned at a distance above said upper surface and ahead of the trailing edge thereof, said nozzle means having a discharge axis disposed in a generally crosswise direction with respect to said air flow and intersecting said upper surface, and means for supplying pressure fluid to said nozzle means to form jets crosswise of said air flow.

2. The combination of claim 1, wherein the flow separation preventing device is in the form of an airfoil extending parallel to the upper surface of the wing, the nozzle means opening on the lower surface of said airfoil.

References Cited in the file of this patent
UNITED STATES PATENTS

| 1,580,577 | Baumann | Apr. 13, 1926 |
| 1,780,298 | Icre | Nov. 4, 1930 |
| 1,820,919 | Masey | Sept. 1, 1931 |
| 1,823,655 | Huseby | Sept. 15, 1931 |
| 1,876,472 | Schweisthal | Sept. 6, 1932 |
| 1,887,148 | De Ganahl | Nov. 8, 1932 |
| 2,041,786 | Stalker | May 26, 1936 |
| 2,041,790 | Stalker | May 26, 1936 |
| 2,430,431 | Lanier | Nov. 4, 1947 |

FOREIGN PATENTS

| 471,177 | Great Britain | Aug. 30, 1937 |